May 16, 1950 R. E. HERSEY 2,508,026
CALLING-LINE IDENTIFICATION SYSTEM
Filed Nov. 24, 1947 6 Sheets-Sheet 1
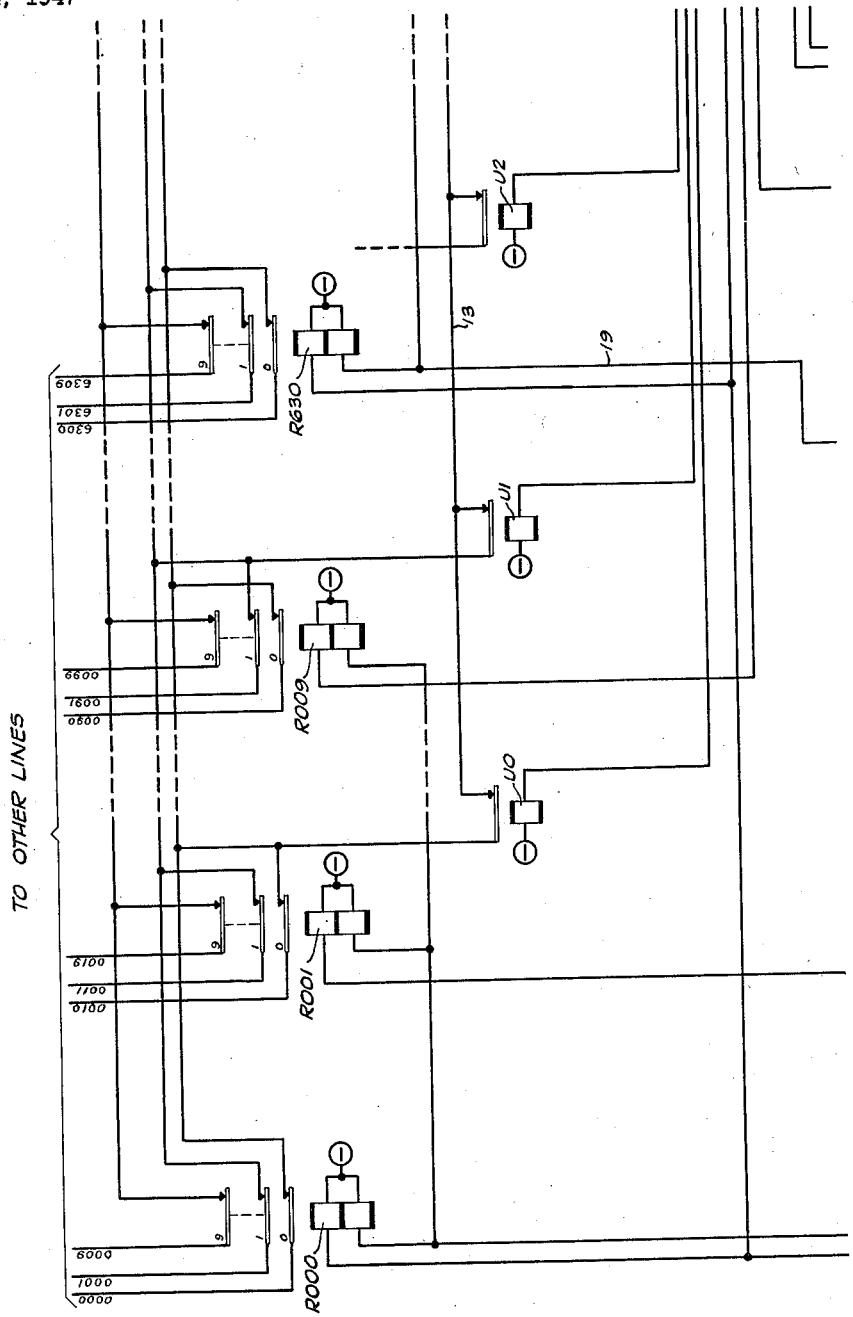
INVENTOR
R. E. HERSEY
BY R. Marino
ATTORNEY

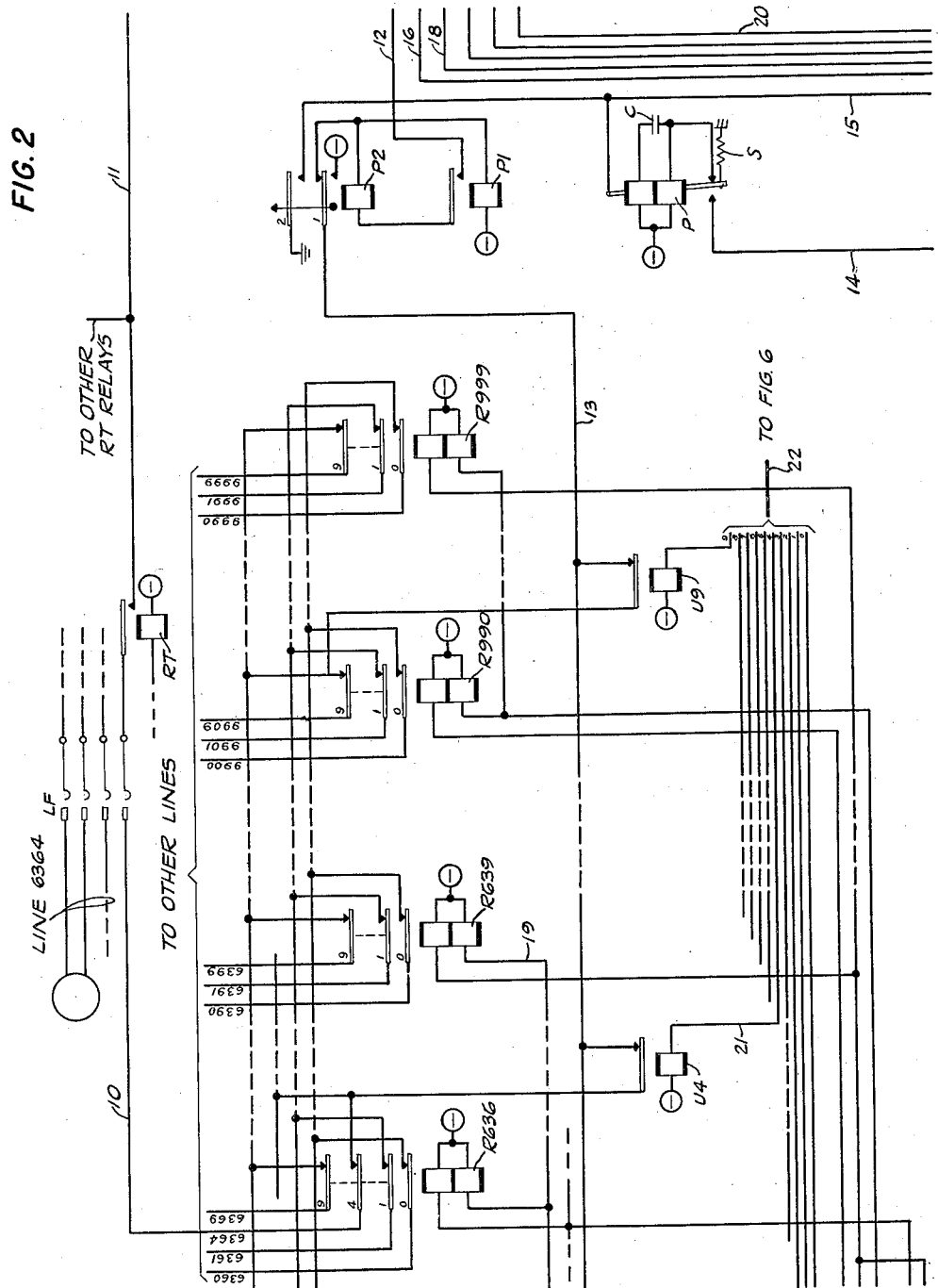

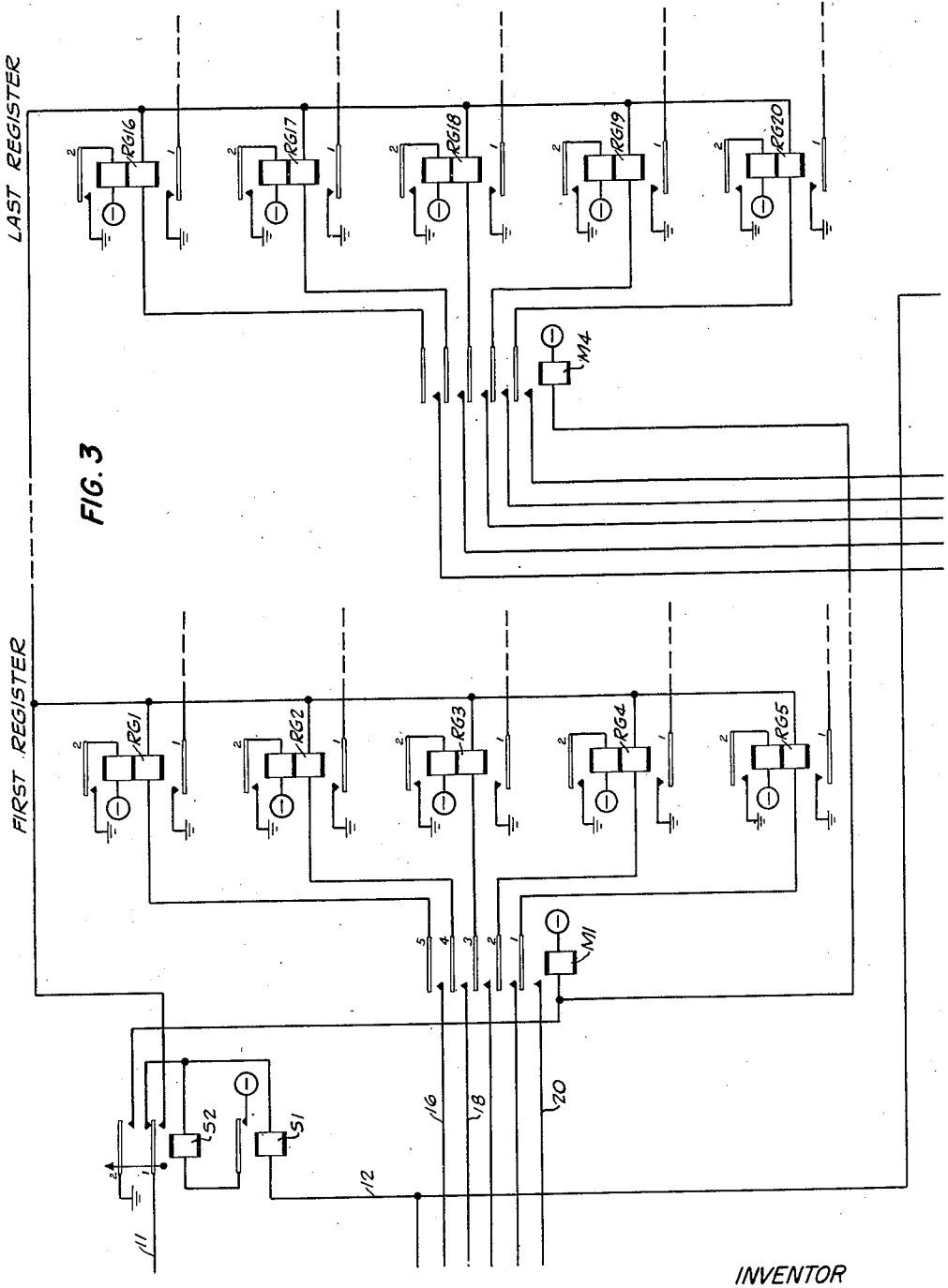

May 16, 1950  R. E. HERSEY  2,508,026
CALLING-LINE IDENTIFICATION SYSTEM
Filed Nov. 24, 1947  6 Sheets-Sheet 4
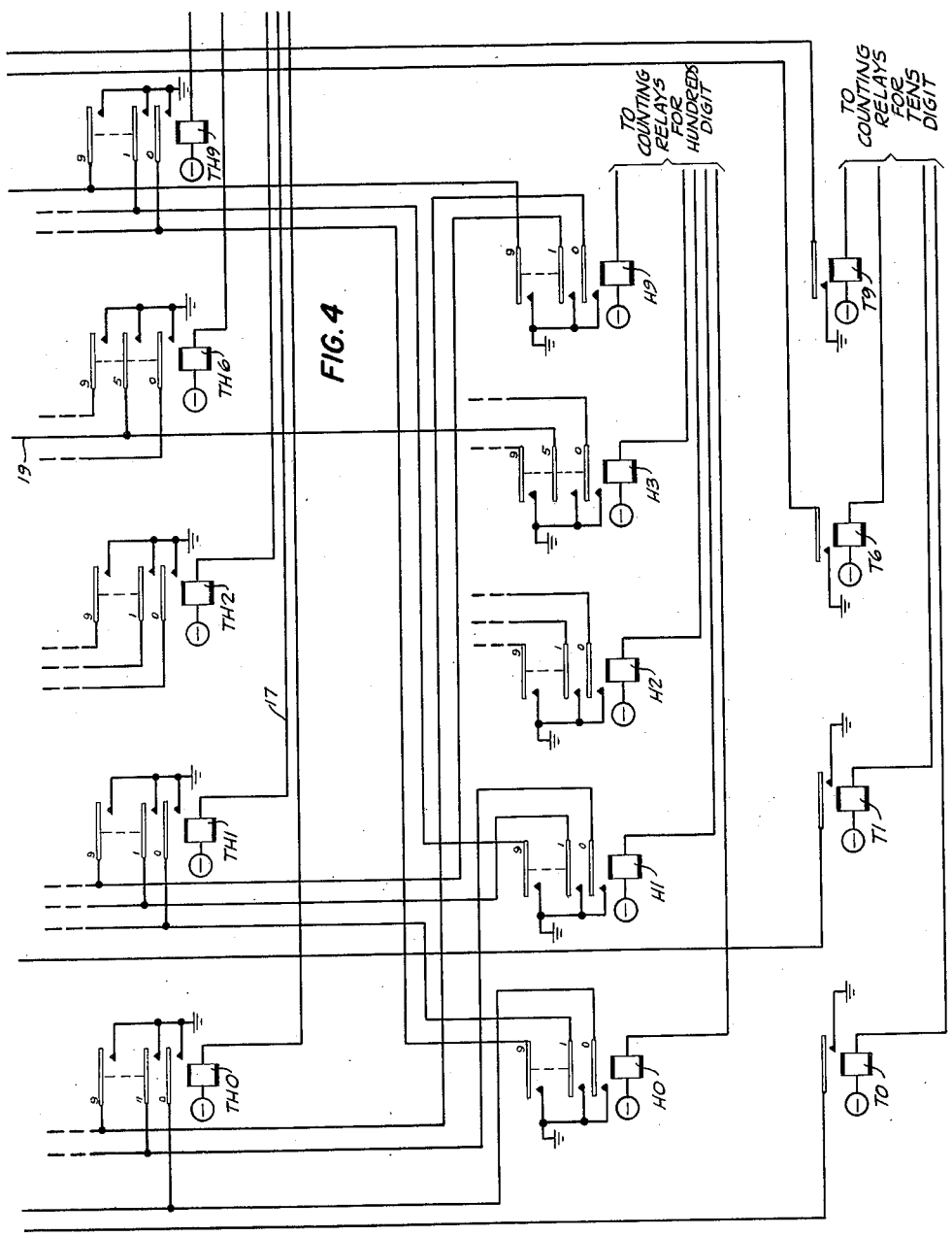
INVENTOR
R. E. HERSEY
BY
*R. Marino*
ATTORNEY May 16, 1950 R. E. HERSEY 2,508,026
CALLING-LINE IDENTIFICATION SYSTEM
Filed Nov. 24, 1947 6 Sheets-Sheet 5
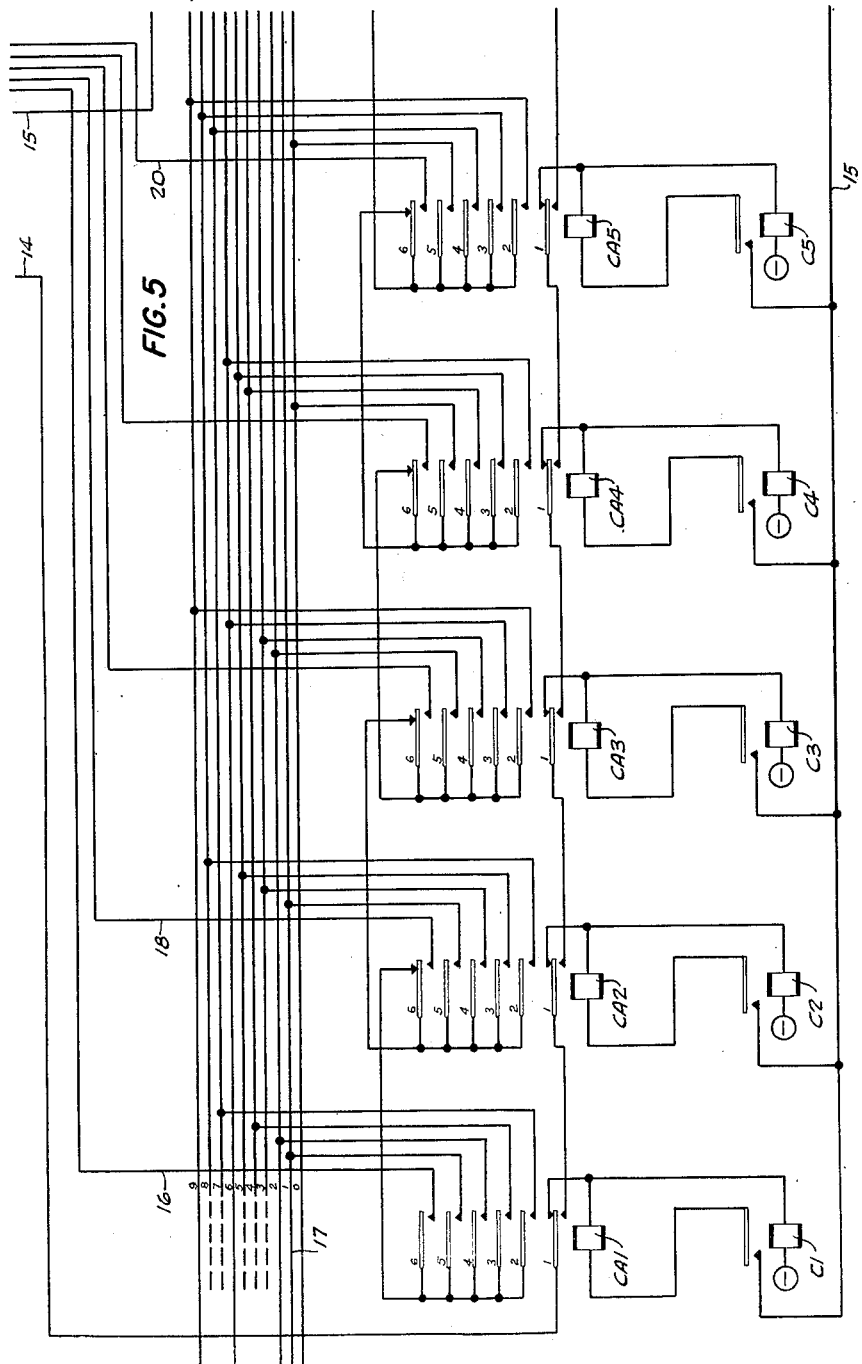
INVENTOR
R.E. HERSEY
BY
ATTORNEY

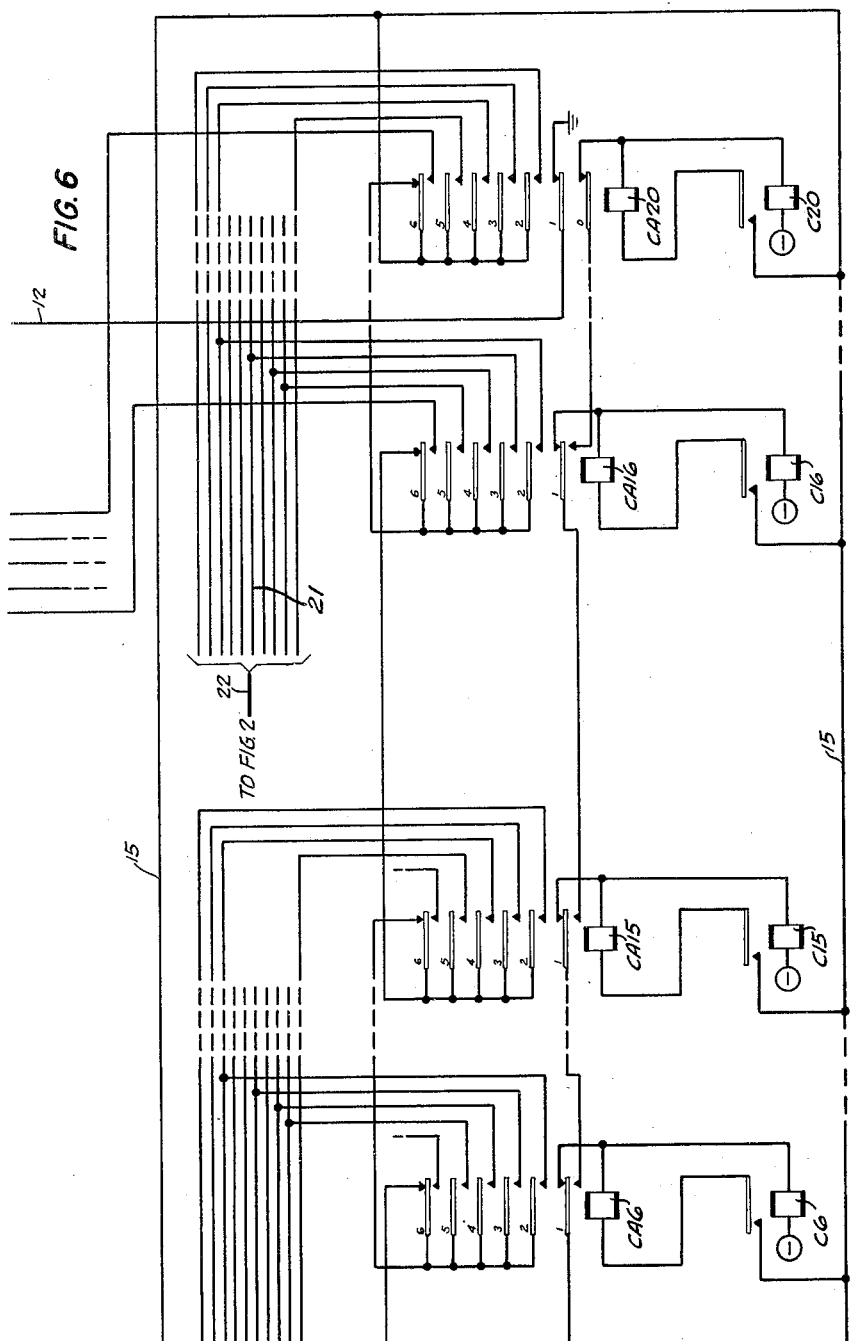

Patented May 16, 1950

2,508,026

UNITED STATES PATENT OFFICE 2,508,026

CALLING-LINE IDENTIFICATION SYSTEM

Ralph E. Hersey, Madison, N. J., assignor to Bell Telephone Laboratories, Incorporated, New York, N. Y., a corporation of New York Application November 24, 1947, Serial No. 787,633

7 Claims. (Cl. 179—27)

This invention relates to telephone systems and more particularly to systems for identifying calling lines.

In automatic telephone systems, identification of calling lines is often required for billing purposes or for other reasons and various systems for automatically identifying calling lines have been proposed. In some systems, calling lines are identified by their locations on the connecting switches. For billing purposes, however, it is necessary to determine the directory numbers of the lines. Some systems require the use of complicated and delicate apparatus for this purpose.

The present invention discloses a novel system for automatically identifying calling lines and directly determining their directory numbers. In this system, only simple relays of well-known characteristics are employed.

Features of the invention are the use of time-spaced impulses for the identification of calling lines, the formation of time-spaced impulses into codes indicative of the line designations, and the application of characteristic combinations of impulses to all lines for the identification of any one of said lines.

These and other features of the invention will be more apparent from the accompanying description, the appended claims, and the drawings, in which:

Fig. 1 shows a portion of the identification circuits;

Fig. 2 shows another portion of the identification circuits, and a calling line;

Fig. 3 shows register circuits;

Fig. 4 shows another portion of the identification circuits;

Figs. 5 and 6 show counting relay circuits; and

Fig. 7 shows how the above figures should be placed in relation to one another.

In accordance with the present invention, one conductor for each line which may be required to be identified is used for identification purposes. This conductor may be that ordinarily provided for operating a message register, the message register being removed. The invention is, therefore, particularly adapted for use in telephone offices now provided with message registers but in which the message registers are to be replaced by a recording device or system. Said conductors of all lines are normally connected together through the contacts of relays. Since the conductors are reserved for identification, the connection does not affect the normal operation of the connecting and talking eqipment. When it is desired to identify a calling line, a series of impulses, equally spaced in time, is applied to the contacts of all of said relays but, simultaneously with each impulse, certain of said relays are operated to open their contacts, thereby opening the circuits of the conductors associated with some of the lines. Each impulse, therefore, is transmitted through the closed contacts of unoperated relays to the conductors associated with some of the lines but, because of the open contacts of operated relays, fails to reach the conductors associated with other lines. However, at successive impulses, different combinations of relays are operated so that, at the conductor associated with any particular line, certain of the impulses are received and others omitted. The time-spacing of the received impulses forms a code indicative of the directory number of the line.

For lines having numbers from "0000" to "9999," as is commonly the case in dial telephone offices, twenty pulses are used to indicate the directory number, the first five pulses being employed to form the code indicating the thousands digit, the second five pulses forming the code for the hundreds digit, the third five pulses forming the code for the tends digit, and the last five pulses forming the code for the units digit.

Any suitable code may be used. In the present embodiment of the invention, the following code is employed:

| Digit | Pulses Received from Group of 5 Pulses |
|---|---|
| 0 | 1st, 2nd and 3rd |
| 1 | 3rd, 4th and 5th |
| 2 | 2nd, 4th and 5th |
| 3 | 1st, 4th and 5th |
| 4 | 2nd, 3rd and 5th |
| 5 | 1st, 3rd and 5th |
| 6 | 1st, 2nd and 5th |
| 7 | 2nd, 3rd and 4th |
| 8 | 1st, 3rd and 4th |
| 9 | 1st, 2nd and 4th |

In Figs. 1 and 2, relays R000 . . . R999 (relays R000, R001, R009, R030, R036, R039, R990 and R999 only being shown) are the relays to the contacts of which the identification conductors are connected and which are operated to form the pulses into codes for the thousands, hundreds, and tens digits. Each relay has ten contacts to which are connected the identification conductors of ten consecutive lines having directory numbers, the units digits of which are "0" to "9," respectively. For example, to the contacts of relay R000 are connected the identification conductors of the ten lines having the directory numbers "0000" to "0009," inclusive; to the contacts of relay R001 are connected the identification conductors of the ten lines having the directory numbers "0010" to "0019," inclusive; to the contacts of relay R636 are connected the identification conductors of the ten lines having the directory numbers "6360" to "6369," inclusive; and to the contacts of relay R999 are connected the identification conductors of the ten lines having the director numbers "9990" to "9999," inclusive. The connection of each identification conductor is made in the manner shown for conductor 10 of line No. 6364.

Corresponding contacts of relays R000 . . . R999 are connected together and to contacts of relays U0 . . . U9 (relays U0, U1, U2, U4 and U9 only being shown). For example, the No. 0 fixed contacts of relays R000 . . . R999 are connected together and to the movable contact of relay U0 and the No. 1 fixed contacts of relays R000 . . . R999 are connected together and to the movable contact of relay U1. Other contacts of relays R000 . . . R999 and relays U2 . . . U5 are similarly connected. It will be observed that with none of said relays operated, potential applied to conductor 13 will reach conductors associated with all lines, but that operation of any one of the relays R000 . . . R999 removes said potential from the conductors associated with ten lines having consecutive numbers, while operation of one of the relays U0 . . . U9 removes said potential from the conductors associated with all lines having numbers, the units digit of which corresponds to the number of said relay.

Each of relays R000 . . . R999 has two windings. The lower windings of said relays are connected together in groups of ten consecutive relays. For example, the lower windings of the ten relays R000 . . . R009 (relays R000, R001 and R009 only being shown) are connected together and the lower windings of relays R630 . . . R639 (relays R630, R636, and R639 only being shown) are connected together. Relays R000 . . . R999 may, therefore, be operated through their lower windings in groups of ten, the operation of each group of ten relays removing any potential applied to conductor 13 from the conductors associated with one hundred lines having consecutive numbers with the same hundreds digit. For example, operation of relays R000 . . . R009 removes potential applied to conductor 13 from the conductors associated with lines having the numbers "0000" to "0099" which have the hundreds digit "0."

The upper windings of relays R000 . . . R999 are also connected together in groups of one hundred relays in accordance with the tens digits of the numbers of the associated lines. For example, the upper windings of the one hundred relays R000, R010, R020 . . . R630 . . . R990 (relays R000, R630 and R990 only being shown) are connected together. These relays are all associated with lines whose numbers all have the tens digit "0." Likewise the upper windings of the one hundred relays R009 . . . R539 . . . R999, associated with lines having the tens digit "9," are connected together. Operation of any group of the relays R000 . . . R999 through their upper windings, therefore, removes potential applied to conductor 13 from the conductors associated with the one thousand lines having the same tens digit.

The operation of relays R000 . . . R999 is controlled by three groups of ten relays each. Relays TH0 . . . TH9 (relays TH0, TH1, TH2, TH6 and TH9 being shown) are used to produce the thousands-digit code, relays H0 . . . H9 (relays H0, H1, H2, H3 and H9 being shown) are used to produce the hundreds-digit code, and relays T0 . . . T9 (relays T0, T1, T6 and T9 being shown) are used to produce the tens-digit code. Each of relays TH0 . . . TH9 has ten contacts connected to the lower windings of those of relays R000 . . . R999 which are associated with lines having numbers with a common thousands digit. For example, contacts of relay TH0 are connected to the lower windings of relays R000 . . . R099 which are associated with lines having numbers with the thousands digit "0" and contacts of relay TH9 are connected to the lower windings of relays R900 . . . R999 which are associated with lines having numbers with the thousands digit "9." Each of relays H0 . . . H9 has ten contacts connected to the lower windings of relays associated with lines having numbers with a common hundreds digit. For example, the contacts of relay H0 are connected to the lower windings of relays R000 . . . R009, R100 . . . R109, R200 . . . R209, etc., which are associated with lines having numbers with the hundreds digit "0" and contacts of relay H3 are connected to the lower windings of relays R030 . . . R039, R130 . . . R139, R630 . . . R639, etc., which are associated with lines having numbers with the hundreds digit "3." Similarly, each of relays T0 . . . T9 has one contact connected to the upper windings of the relays R000 . . . R999 associated with lines having numbers with a common tens digit. For example, the contact of relay T0 is connected to the upper windings of relays R000, R010, R020 . . . R630 . . . R990 which are associated with lines having numbers with the tens digit "0" and the contact of relay T9 is connected to the upper windings of relays R009, R019 . . . R539 . . . R999 which are associated with lines having numbers with the tens digit "9."

Operation of one of the relays TH0 . . . TH9, for example, relay TH0, therefore opens the circuits of the conductors associated with all lines having numbers with the thousands digit "0"; operation of one of the relays H0 . . . H9, for example relay H0, opens the circuits of the conductors associated with all lines having numbers with the hundreds digit "0"; operation of one of the relays T0 . . . T9, for example, relay T0, opens the circuits of the conductors associated with all the lines having numbers with the tens digit "0"; and operation of one of the relays U0 . . . U9, for example, relay U0, opens the circuits of the conductors associated with all lines having numbers with the units digit "0."

To identify a calling line, for example, line 6364 extended by switch LF, which may be a line finder, a line switch, or other form of switch for extending a calling line, and to indicate the directory number of said line, conductor 10 associated with said line, extended by the lower contacts of switch LF, is connected by any suitable means, for example, relay RT, to conductor 11. A circuit is thereby completed from battery through the winding of relay P1, No. 1 back contacts of relay P2, conductor 13, contacts of relay U4, No. 4 contacts of relay R636, conductor 10, lower contacts of switch LF, contacts of relay RT, conductor 11, No. 1 back contacts of relay S2, winding of relay S1, conductor 12 and No. 1 contacts of relay CA20 to ground, over which relays P1 and S1 operate. Relay P2 then operates in series with relay P1 to the above-traced ground on conductor 12, locking up the latter relay, and relay S2 operates in series with S1 to the same ground, locking up relay S1. Relays M1 ... M5 (relays M1 and M5 only being shown) operate in parallel over an obvious circuit through No. 2 contacts of relay S2 to ground. A circuit is also completed from battery through the lower winding and right-hand contacts of the biased polarized relay P and No. 2 contacts of relay P2 to ground. The current in this circuit tends to cause said relay to close its left-hand contacts against the tension of spring S. However, condenser C charges from battery through the upper winding of relay P and to ground through right-hand contacts of relay P and No. 2 contacts of relay P2. The charging current through the upper winding of relay P holds the right-hand contacts of relay P closed for some time but as condenser C charges, the charging current diminishes and the armature of relay P is moved from the right-hand contact by the current in the lower winding of said relay. The circuit of the lower winding is thereby opened and condenser C discharges through both windings of relay P, moving the armature of said relay to the left-hand contact. As said condenser discharges, the discharge current diminishes and the armature of relay P is moved to the right-hand contact by the biasing spring S, thereby reestablishing the above-traced circuit of the lower winding of said relay and commencing a repetition of the operations described above. Relay P, therefore, produces, in effect, a series of time-spaced pulses over conductor 14 which are continued as long as the No. 2 contacts of relay P2 are closed, the timing and length of said pulses depending upon the characteristics of said relay and the capacity of condenser C. While relay P is the preferred means of producing time-spaced impulses, other well-known means, such as an interrupter, can be used for this purpose.

Relay RT which, in the present embodiment of the invention, serves to initiate identification of a line, may be associated with the switch by which said line is extended and may be operated by well-known means when said line is extended through said switch, or upon the completion of the subscriber's connection, or upon the answer of the called subscriber or at any other suitable time when identification of the line is required. As indicated in Fig. 2, conductor 11 may be connected to other RT relays associated with other switches so that the identification equipment may be used to identify other lines extended by those switches. In the present embodiment of the invention, however, only one line may be identified at one time. The various RT relays are, therefore, controlled by a lock-out circuit which assures that only one RT relay is operated at one time. It is not thought necessary to disclose here the lock-out circuit, as any suitable circuit may be used and such circuits are well known.

Relays C1 ... C20 and CA1 ... CA20 (relays C1 ... C5, C16, C20, CA1 ... CA5, CA16, and CA20 only being shown) constitute a counting chain of well-known form for counting the pulses produced by relay P. When the left-hand contacts of relay P close for the first time, relay C1 operates over a circuit extending from battery through the winding of said relay, No. 1 back contacts of relay CA1, conductor 14, left-hand contacts of relay P, and No. 2 contacts of relay P2 to ground. When the left-hand contacts of relay P then open, relay CA1 operates in series with relay C1 through contacts of relay C1, conductor 15, and No. 2 contacts of relay P2 to ground, locking up relay C1. When the left-hand contacts of relay P close for the second time, relay C2 operates over a circuit extending from battery through the winding of said relay, No. 1 back contacts of relay CA2, No. 1 front contacts of relay CA1, conductor 14, left-hand contacts of relay P, and No. 2 contacts of relay P2 to ground. When the left-hand contacts of relay P again open, relay CA2 operates in series with relay C2 through the contacts of the latter relay, conductor 15 and No. 2 contacts of relay P2 to ground. When the left-hand contacts of relay P again close, relay C3 operates in a manner similar to relay C2 and when said contacts open, relay CA3 operates in a manner similar to relay CA2. Relays C4 to C20 and CA4 to CA20 operate successively in a similar manner on subsequent closings and openings of the left-hand contacts of relay P.

When relay CA1 operates, as described above, relays TH1, TH2, TH4, and TH7 operate. Relay TH1, for example, operates over a circuit extending from battery through the winding of said relay, conductor 17, No. 5 contacts of relay CA1, No. 6 back contacts of relays CA2 ... CA20 in series, conductor 15, and No. 2 contacts of relay P2 to ground. Relays R100 ... R109, R110 ... R119, R120 ... R129, etc., relays R200 ... R209, R210 ... R219, R220 ... R229, relays R400 ... R409, R410 ... R419, R420 ... R429, etc., and relays R700 ... R709, R710 ... R719, R720 ... R729, etc., are thereby operated but perform no useful function at this time. A circuit is completed from battery through the No. 1 front contacts of relay P2, conductor 13, contacts of relay U4, No. 4 contacts of relay R636, conductor 10, lower contacts of switch LF, contacts of relay RT, conductor 11, No. 1 front contacts of relay S2, lower winding of relay RG1, No. 5 contacts of relay M1, conductor 16, No. 6 contacts of relay CA1, No. 6 back contacts of relays CA2 ... CA20 in series, conductor 15 and No. 2 contacts of relay P2 to ground, over which relay RG1 operates and locks up over a circuit extending from battery through its upper winding and No. 2 contacts to ground.

When relay CA2 operates, as described above, the operating circuits of relays TH1, TH2, TH4 and TH7 are opened at No. 6 back contacts of relay CA2 and said relays released, releasing, in turn, relays R100 ... R109, R110 ... R119, etc. Relays TH1, TH3, TH5 and TH8 now operate, relay TH1, for example, operating over a circuit extending from battery through the winding of said relay, conductor 17, No. 5 contacts of relay CA2, No. 6 back contacts of relays CA3 ... CA20 in series, conductor 15, and No. 2 contacts of relay P2 to ground, operating relays R100 ... R109, R110 ... R119, R120 ... R129, etc., relays R300 ... R309, R310 ... R319, R320 ... R329, etc., relays R500 ... R509, R510 ... R519, R520 ... R529, etc., and relays R800 ... R809, R810 ... R819, R820 ... R829, etc. Operation of said relays performs no useful function at this time. A circuit is established from battery through No. 1 front contacts of relay P2, conductor 13, contacts of relay U4, No. 4 contacts of relay R636, conductor 10, lower contacts of switch LF, contacts of relay RT, conductor 11, No. 1 front contacts of relay S2, lower winding of relay RG2, No. 4 contacts of relay M1, conductor 18, No. 6 front contacts of relay CA2, No. 6 back contacts of relays CA3 ... CA20 in series, conductor 15, and No. 2 contacts of relay P2 to ground, over which relay RG2 operates and locks up over a circuit extending from battery through its upper winding and No. 2 contacts to ground.

When relay CA3 operates, the operating circuits of relays TH1, TH3, TH5 and TH8 are opened at No. 6 back contacts of relay CA3 and said relays released, releasing, in turn, relays R100 ... R109, R110 ... R119, etc. Relays TH2, TH3, TH6 and TH9 now operate over circuits similar to those already traced, operating, in turn, relays R200 ... R209, R210 ... R219, etc. Among the relays now operated is relay R636. The circuit of this relay may be traced from battery through the lower winding of said relay, conductor 19, and No. 5 contacts of relay TH6 to ground. No circuit is now completed through conductor 10 to the windings of any of the register relays RG1 ... RG5.

When relay CA4 operates, the circuits of relays TH2, TH3, TH6 and TH9 are thereby opened and said relays released, releasing, in turn, the R ... relays operated. Relays TH0, TH4, TH5 and TH6 now operate over circuits similar to those already traced. By the operation of relay TH6, relay R636 is again operated, as described above, and no circuit is completed for any of the register relays RG1 ... RG5.

When relay CA5 operates, the circuits of relays TH0, TH4, TH5 and TH6 are thereby opened and said relays released, releasing, in turn, the R ... relays operated by them. Relays TH0, TH7, TH8 and TH9 now operate over circuits similar to those already traced, operating the associated combination of R ... relays. Relay R636 is, however, not operated and a circuit is completed from battery through No. 1 front contacts of relay P2, conductor 13, contact of relay U4, No. 4 contacts of relay R636, conductor 10, lower contacts of switch LF, contacts of relay RT, conductor 11, No. 1 front contacts of relay S2, lower winding of relay RG5, No. 1 contacts of relay M1, conductor 20, No. 6 front contacts of relay CA5, No. 6 back contacts of relays CA6 ... CA20 in series, conductor 15, and No. 2 contacts of relay P2 to ground, over which relay RG5 operates and locks up over a circuit extending from battery through its upper winding and No. 2 contacts to ground.

Relays RG1, RG2 and RG5, in the first register, thus operated and locked up, form a combination corresponding, in accordance with the code previously given, to the digit "6" which is the first digit of the directory number of line 6364 being identified. In like manner, in conjunction with relays H0 ... H9, successive operations of relay P cause the operation and locking up of the first, fourth and fifth relays in a second register (not shown) similar to the first register, registering the digit "3" as the second digit of the number of line 6364, and, in conjunction with relays T0 ... T9, succeeding operations of relay P cause the operation and locking up of the first, second and fifth relays in a third register (not shown) similar to the first register, registering the third digit of the number of line 6364 as digit "6."

Similarly, when counting relays CA16 and CA19 operate (relay CA16 only being shown) relay U4 is thereby operated. For example, when relay CA16 operates, a circuit is completed from battery through the winding of relay U4, conductor 21 within bracket 22, No. 3 contacts of relay CA16, No. 6 back contacts of relays CA17 ... CA20 in series, conductor 15, and No. 2 contacts of relay P2 to ground, over which relay U4 operates. The circuit, previously traced, through conductor 10, is thereby opened and none of relays RG16 ... RG20 are caused to operate. But when relays CA17, CA18 and CA20 operate, the circuit of relay U4 is not closed and the above-mentioned circuit through conductor 10 remains closed, causing the operation of relays RG17, RG18 and RG20 in the manner already described for other register relays. The digit "4" is thereby registered by relays RG16 ... RG20 as the last digit of the number of line 6364.

When relay CA20 operates, the locking circuits of relays S1 and S2 and of relays P1 and P2 are opened and said relays released. The circuit of relay P and the locking circuits of relays C1 ... C20 and CA1 ... CA20 are thereby opened at No. 2 contacts of relay P2. Relay P, therefore, ceases to operate and relays C1 ... C20 and CA1 ... CA20 release, releasing, in turn any relays operated by relay CA20. By the release of relay S2, relays M1 ... M5 are released. Relays S2 and P2 are made slow to release to give time for relay RG20 to operate in response to the last pulse. The operated register relays remain locked up until released by any suitable means and the circuits closed by their No. 1 contacts, may be used to operate other devices to record the registered directory number.

While the above description has been confined to the identification of line 6364, when extended by switch LF, it will be understood that any other line, when extended by switch LF, may be identified in a similar manner upon the operation of relay RT, and that other lines, extended by other switches, may be similarly identified upon the operation of RT relays associated with said switches. Thus, a plurality of calling lines may be identified in rapid succession in response to the successive operation of the associated RT relays.

While I have illustrated my invention by one embodiment thereof and in one form, it will be evident to one skilled in the art that it may be employed in other embodiments and in other forms. The terms and expressions which I have used in reference to this invention are used as terms of description and not of limitation and I have no intention in the use of such terms and expressions of excluding equivalents or modifications of the features shown and described but, on the contrary, intend to include therein any and all equivalents and modifications which may be employed without departing from the spirit of the invention.

What is claimed is:

1. In a telephone system, lines each having a numerical designation, means for producing successive impulses, means for selectively applying to all of said lines simultaneously combinations of said impulses indicative of the designations of said lines, and means for registering the impulses on one of said lines.

2. In a telephone system, lines each having a numerical designation, means for producing succesive impulses, means for counting said impulses, means for selectively applying combinations of said counted impulses to all of said lines simultaneously in accordance with the designations of said lines, and means for registering the impulses on one of said lines.

3. In a telephone system, a calling line having a numerical designation composed of digits, a plurality of groups of relays, means for actuating each of said groups of relays successively to apply to said line a combination of impulses indicative of one of the digits of said designation, and means for registering the impulses on said line.

4. In a telephone system, lines each having a numerical designation composed of digits, means for producing successive impulses, a plurality of groups of relays, means for actuating each of said groups of relays successively to apply to each of said lines a combination of said impulses indicative of one of the digits of the designation of said line, and means for registering the impulses on one of said lines.

5. In a telephone system, lines each having a numerical designation, means for producing successive impulses, means for selectively applying to all of said lines simultaneously successive combinations of said impulses indicative of the designations of said lines, and means for successively registering the impulses on each of said lines.

6. In a telephone system, lines each having a numerical designation, means for producing successive impulses, means for counting said impulses, means for selectively applying said counted impulses to each of said lines in accordance with the designation of said line, and means for successively registering the impulses on each of said lines.

7. In a telephone system, lines each having a numerical designation composed of digits, means for producing successive impulses, a plurality of groups of relays, means for actuating each of said groups of relays successively to apply to each of said lines a combination of said impulses indicative of one of the digits of the designation of said line, and means for successively registering the impulses on each of said lines.

RALPH E. HERSEY.

REFERENCES CITED

The following references are of record in the file of this patent:

UNITED STATES PATENTS

| Number | Name | Date |
| --- | --- | --- |
| 1,864,082 | Massomneau | June 21, 1932 |
| 2,306,173 | Logam | Dec. 22, 1942 |
| 2,306,729 | Holdem | Dec. 29, 1942 |
| 2,387,897 | Grandstaff | Oct. 30, 1945 |
| 2,396,072 | Babcock | Mar. 5, 1946 |
| 2,410,520 | Ostline | Nov. 5, 1946 |